April 9, 1940.  G. MEYER  2,196,422
CAST CRANKSHAFT
Filed Nov. 26, 1938
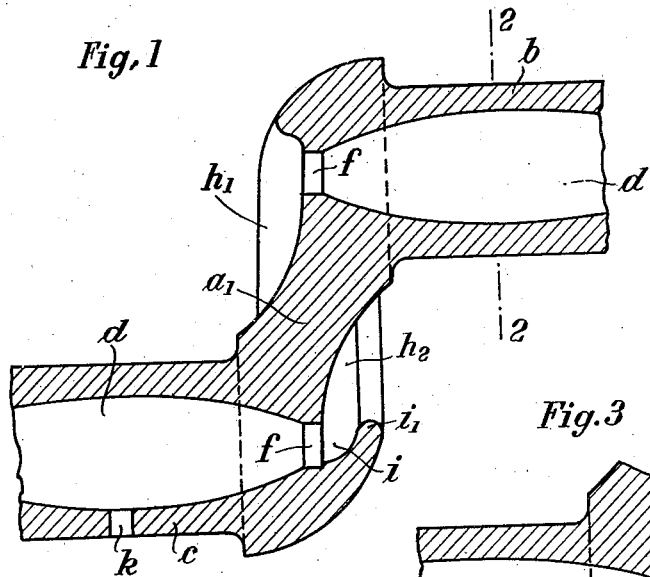
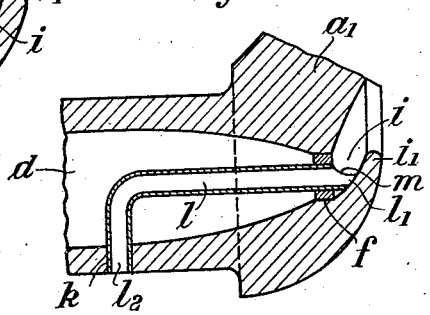
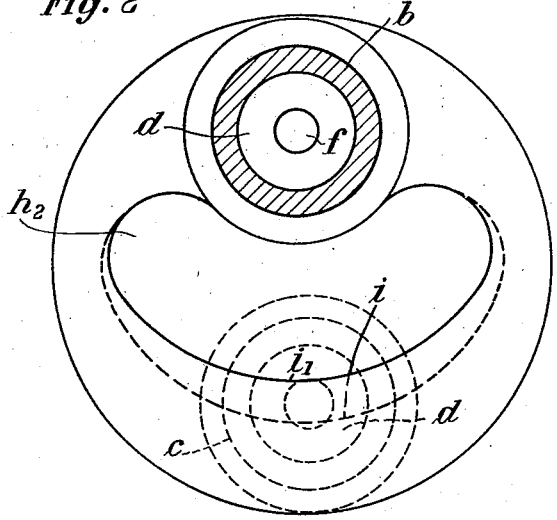
Inventor
Gustav Meyer
By
his Attorney Patented Apr. 9, 1940

2,196,422

UNITED STATES PATENT OFFICE 2,196,422

CAST CRANKSHAFT

Gustav Meyer, Berlin, Germany, assignor to Mitteldeutsche Stahlwerke A.-G., Riesa-on-the-Elbe, Germany Application November 26, 1938, Serial No. 242,478
In Germany November 30, 1937

4 Claims. (Cl. 74—605)

This invention relates to a cast crankshaft which has in the pins and cheeks cell-like closed hollow spaces whose walls are reinforced at the points where they merge one into the other according to the bending and torsional stresses which arise, or whose cheeks have instead of closed hollow spaces trough-like recesses with similarly constructed walls.

The invention relates to the special construction of the trough-like recesses in such crank cheeks into which the closed, preferably barrel-shaped hollow spaces of the pins extend.

It is usual in modern engines, especially aircraft engines, and in Diesel engines, to shorten more and more the distance between the axes of the pins which are connected to the crank cheeks, even to the extent that the pins partly overlap.

According to the invention the trough-shaped recesses in the case of crank cheeks, preferably of circular periphery, owing to the adaptation to the relative positions of the pins, are approximately of kidney shape. Such trough-shaped recesses are particularly useful as oil pockets. For this purpose each trough-shaped recess which is beside a journal has a brim-like edge through which the oil flowing out from the journal is caught in the pocket formed by the brim-like edge and flows through the casting hole of the crank pin into the hollow space therein. The oil passes out of this hollow space through the lubricating hole on to the surface of the crank pin.

By the construction of the trough-shaped recesses as oil pockets according to the invention, separate feed conduits for the lubricating oil, for example in the form of continuous passages or subsequently fitted oil tubes are no longer necessary and omitted, because the hollow space of the crank pin, owing to its barrel shape, effects the direct feed of the lubricating oil from the trough-shaped recess constructed as an oil pocket to the lubricating hole arranged in the wall of the crank pin.

The feed of the lubricating oil from the oil pocket to the surface of the crank pin may also be effected by means of a tube one of whose ends is located in the oil pocket whereas its other end is in the lubricating hole. The end of the tube located in the oil pocket has an admission aperture for the lubricant.

The tube constructed as oil conduit is used during the casting of the crankshaft as support for the core which is necessary for forming the hollow space in the pin.

An embodiment of the invention is illustrated by way of example in the accompanying drawing, in which:

Fig. 1 shows a crank of a crankshaft in longitudinal section through a crank pin, a crank cheek and a journal, Fig. 2 is a section on line 2—2 of Fig. 1 showing in side elevation the crank cheek with trough-like recess constructed as oil pocket, Fig. 3 shows in longitudinal section a portion of the crank pin with oil feed tube.

$a^1$ is a crank cheek, $b$ a journal and $c$ a crank pin. The hollow spaces in the journal and crank pin are designated by $d$. These hollow spaces $d$ extend into the crank cheeks $a^1$. Trough-like recesses in the crank cheek $a^1$ are designated by $h^1$ and $h^2$. According to the invention the trough-like recess $h^2$ directed toward the journal $b$ is constructed as an oil pocket at $i$, this pocket being formed by a brim-like edge $i^1$. When the shaft is running, the oil in the recess $h^2$ is conducted by centrifugal force through the casting hole $f$ to the inner barrel-shaped wall of the hollow space $d$, the barrel-shaped wall forming the natural feed conduit to the lubricating hole $k$ under the action of the centrifugal force.

According to Fig. 3 the core support of the core for forming the hollow space is constructed as oil conduit, and for this purpose is constructed as a tube. The end $l^1$ of this oil feed tube extends into the oil pocket $i$ and its other end $l^2$ is located in the lubricating hole $k$. The oil feed tube has an admission aperture $m$ for the lubricating oil at its end $l^1$. The lubricating oil is conducted from the oil pocket $i$ directly to the surface of the crank pin $c$ by this tube $l$.

I claim:

1. A cast crankshaft, comprising in combination a crank cheek, a journal extending laterally from one side of said cheek and a crank pin extending laterally from the other side of said cheek, said journal and said crank pin being of tubular formation with the inner walls thereof tapering towards opposite ends and with the inner tapered ends extending into said cheek, said cheek having trough-shaped recesses one on each side between said journal and said crank pin and of generally arcuate formation.

2. A cast crankshaft as specified in claim 1, in which the trough-shaped recess beside the journal is constructed as an oil pocket and has a brim-shaped edge.

3. A cast crankshaft as specified in claim 1, in which the trough-shaped recess beside the journal is constructed as an oil pocket and in which a tube serving as core support during the casting of the crankshaft forms a conduit for feeding the oil to the surface of the crank pin, one end being located in said pocket and its other end in a lubricating hole in said pin.

4. A cast crankshaft as specified in claim 1, in which the trough-shaped recess beside the journal is constructed as an oil pocket and in which a tube serving as core support during the casting of the crankshaft forms a conduit for feeding the oil to the surface of the crank pin, one end being located in said pocket and its other end in a lubricating hole in said pin, and the end of the tube located in the pocket having an admission aperture for the lubricating oil.

GUSTAV MEYER.